US010291754B2

(12) United States Patent
Parnaby et al.

(10) Patent No.: US 10,291,754 B2
(45) Date of Patent: May 14, 2019

(54) APPARATUS, SYSTEM, AND METHOD FOR AUTO-NEGOTIATION

(71) Applicant: Avago Technologies International Sales Pte. Limited, Singapore (SG)

(72) Inventors: Gavin D. Parnaby, Laguna Niguel, CA (US); John S. Wang, Sunnyvale, CA (US); Michael Le, Huntington Beach, CA (US); Chung-Jue Chen, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 711 days.

(21) Appl. No.: 14/805,191

(22) Filed: Jul. 21, 2015

(65) Prior Publication Data

US 2016/0381190 A1 Dec. 29, 2016

Related U.S. Application Data (60) Provisional application No. 62/183,302, filed on Jun. 23, 2015.

(51) Int. Cl.
| | |
|---|---|
| G06F 15/173 | (2006.01) |
| H04L 29/06 | (2006.01) |
| H04L 29/08 | (2006.01) |
| H04L 5/14 | (2006.01) |
| H04L 25/03 | (2006.01) |
| H04L 25/02 | (2006.01) |
| H04L 12/935 | (2013.01) |
| H04L 12/24 | (2006.01) |

(52) U.S. Cl.
CPC ............ *H04L 69/24* (2013.01); *H04L 29/06* (2013.01); *H04L 67/14* (2013.01); *H04L 69/08* (2013.01); *H04L 5/1438* (2013.01); *H04L 5/1446* (2013.01); *H04L 25/0204* (2013.01); *H04L 41/0853* (2013.01); *H04L 49/3054* (2013.01); *H04L 65/1069* (2013.01); *H04L 67/142* (2013.01); *H04L 2025/03426* (2013.01)

(58) Field of Classification Search
CPC ............ H04L 5/1438; H04L 41/0853; H04L 49/3054; H04L 67/14; H04L 47/805; H04L 69/24; H04L 67/142; H04L 29/06; H04L 65/1069; H04L 2025/03426; H04L 25/0204; H04L 69/08; H04L 5/1446
USPC ......... 709/223–224; 370/201, 437, 431, 528, 370/455, 465; 455/513
See application file for complete search history.

*Primary Examiner* — Jungwon Chang
(74) *Attorney, Agent, or Firm* — Sterne, Kessler, Goldstein & Fox P.L.L.C.

(57) ABSTRACT

Methods, systems, and apparatuses, including electrical circuitry, are described for auto-negotiation. Active cables, active backplanes, and line cards may include one or more instances of electrical circuitry and/or integrated circuits that intercept advertisements of standard auto-negotiation protocol signaling from an initiating device for establishment of communication links with a receiving device. Auto negotiation information in the intercepted signaling may be translated and encoded into signaling in accordance with the capabilities of the receiving device. Active cables and active backplanes may also include one or more connection components between instances of electrical circuitry and/or integrated circuits to provide high-speed transmission of data packets encapsulating the auto-negotiation information in a format that differs from the standard auto-negotiation protocol.

9 Claims, 4 Drawing Sheets

APPARATUS, SYSTEM, AND METHOD FOR AUTO-NEGOTIATION

CROSS-REFERENCE TO RELATED APPLICATIONS

This application claims the benefit of U.S. Provisional Application No. 62/183,302, filed on Jun. 23, 2015, the entirety of which is incorporated by reference herein.

BACKGROUND

I. Technical Field

Embodiments described herein relate to auto-negotiation.

II. Background Art

Computing devices and systems, such as those found in data centers and enterprise systems, use auto-negotiation protocols. Auto-negotiation is a simple, slow communications protocol that is used to initialize communications between link partners, e.g., servers, switches, routers, computer components, etc. Auto-negotiation is used to advertise link partner capabilities and to determine which communications protocols are supported by both sides of the link to provide ways to resolve capabilities to the highest common denominator between link partners. Auto-negotiation is defined in clauses 28 and 73 of IEEE standard 802.3 to connect computers, such as servers, to communication switches or routers. For instance, a data center may connect one or more servers to a switch that acts as a communication hub between the servers and a network, such as local area networks (LANs), the Internet, etc.

Prior auto-negotiation solutions use passive cables to establish the physical connections between devices like servers and switches, e.g., using twin-axial cables, etc. These passive cables typically include four channels or sets of transmit/receive wire pairs (i.e., 8 wires per connection). Given the high and increasing number of servers and connections in data centers, server farms, and enterprise systems or networks, the large amount of cabling required increases a number of operation factors such as routing difficulty, material costs, cooling costs due to heat generation, power required to drive multiple passive cables, and cable weight supported by server and switch interfaces.

Additionally, mismatches of communication protocols between legacy and state of the art devices (e.g., different data transmission rates) advertised during auto-negotiation can inhibit full utilization of communication capabilities for newer hardware and devices.

Existing active cable solutions support standard auto-negotiation protocols but do not use higher-speed signaling methods on the line side of their communication links, and therefore have disadvantages in terms of material costs, power, weight, etc. These existing solutions use equalization techniques in their signaling to enable longer communication links with existing signaling approaches.

BRIEF SUMMARY

Methods, systems, and apparatuses are described for auto-negotiation, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Still further, it should be noted that the drawings/figures are not drawn to scale unless otherwise noted herein.

Numerous exemplary embodiments are now described. Any section/subsection headings provided herein are not intended to be limiting. Embodiments are described throughout this document, and any type of embodiment may be included under any section/subsection. Furthermore, it is contemplated that the disclosed embodiments may be combined with each other in any manner.

II. Example Embodiments

The example techniques and embodiments described herein may be adapted to various types of communication environments, communication devices, communication systems, computing environments, computing devices, computing systems, electronic devices, and/or the like, for auto-negotiation. For example, the auto-negotiation techniques described herein may be implemented in, and/or performed by, active cables and active backplanes providing physical connections for devices and systems, as well as line cards providing communication capabilities between computing devices and/or communication devices, according to the techniques and embodiments herein. For instance, and without limitation, active cables, active backplanes, computers (servers, desktops, laptops, etc.), communication switches and/or routers, modems, access points, gateways, enterprise networks, data centers, server farms, etc., may employ the described auto-negotiation techniques in embodiments. Furthermore, additional structural and operational embodiments, including modifications and/or alterations, will become apparent to persons skilled in the relevant art(s) from the teachings herein.

Standard backplane Ethernet auto-negotiation is used to advertise link partner capabilities and to determine which communication protocols are supported by devices on both sides of the link to provide ways to resolve capabilities to the highest common denominator between link partners, and may include features such as forward error correction (FEC), etc. Techniques are described herein that allow each of the devices to initially advertise their capabilities according to standard auto-negotiation protocols to establish a communication link there between. The techniques described herein also provide for novel auto-negotiation schemes that are invisible to connecting devices and that improve the speed with which auto-negotiation is performed. For instance, in embodiments, standard auto-negotiation protocols or modes of operation which are relatively slow may be advertised by initiator devices, but such signaling may be intercepted and terminated. Auto-negotiation information embedded in the terminated signaling may then be translated, encoded, and provided at a high data rate before being encoded in signaling according to standard auto-negotiation protocols or modes of operation for receiving devices. The techniques described herein further provide for improvements in cabling usage and cost, power consumption and heat, connection length, and connection media options.

For example, in an active cable, two integrated circuits (ICs) or electrical circuitry components (e.g., one located at or near each end of the active cable) may be configured to act as auto-negotiation translators for devices connected together via the active cable (e.g., a server connected to a switch, a first switch connected to a second switch, etc.). From the perspective of the connected devices, standard auto-negotiation takes place. The active cable has a main length of connection media that may be comprised of a single receive/transmit conductor pair, such as fiber optic cable or metal wire connecting the two ICs/electrical circuitry components. The ICs/electrical circuitry components communicate to the connected devices by a relatively short length(s) of traditional cable over which standard auto-negotiation protocol information is received/transmitted, according to an auto-negotiation standard such as IEEE 802.3, Clause 73. It is contemplated that a single receive/transmit conductor pair, or multiple conductor pairs, may be used for the connection between the ICs/electrical circuitry components, according to embodiments.

Each IC/electrical circuitry component may be configured to receive auto-negotiation information according to an auto-negotiation protocol standard from a connected device and translate the received information, and each may be configured to generate and transmit auto-negotiation information in encapsulating data packets in a non-standard protocol format to the other IC/electrical circuitry component of the active cable. Each IC/electrical circuitry component may also be configured to encode and transmit auto-negotiation information received in the data packets to their respective connected devices according to the auto-negotiation protocol standard. The packets may be transmitted between the ICs/electrical circuitry components across the main length of connection media of the active cable at a high transmission rate (i.e., a rate that is higher than the connections to one or more of the linked devices). Thus, each linked device is only aware that standard auto-negotiation is taking place. By way of non-limiting example, a server with 100 Gb communication capabilities can negotiate a link connection with a legacy 10 Gb switch at 10×10 Gb or a 25 Gb switch at 4×25 Gb with the server and with the legacy switch each being unaware that the legacy switch per lane speed is multiple times slower than the server. Thus, devices with mismatched communication capabilities may be linked in established communication modes, and each linked device may operate at, near, or above its respective maximum rate for communications.

Backplane auto-negotiation protocols may be similarly handled, according to embodiments, between components and/or devices of a computing device, such as a server computer, coupled to device interfaces of the active backplane. For instance, one or more pairs of board traces or conductive wires of a backplane may be used to connect ICs/electrical circuitry components in a manner similar to that described above for active cable embodiments. The ICs/electrical circuitry components may be communicatively coupled to devices and components of computers via the device interfaces.

The techniques described herein also provide for line cards that utilize an IC/electrical circuitry component, such as one of the ICs/electrical circuitry components described above. In embodiments, such a line card may be configured to be installed in or included with a computing device, such as a server, or a communication device, such as a router or switch. The IC/electrical circuitry component is configured to translate auto-negotiation information between the device with which it is installed/included and another device. For instance, a server that includes a line card according to the embodiments described herein may perform auto-negotiation with a switch where the IC/electrical circuitry component translates each device's auto-negotiation information into transmissions in a format and/or at a rate of the other device to establish a communication link. Similarly, two switches may be linked using a line card configured as described above. As noted above, the example server and switches for which a link is sought to be established are unaware of any communication mismatches between them.

Communications between the example servers and switches may take place over a passive cable that is coupled to an interface of the line card.

Techniques described herein further provide for a reduction in the operating factors noted above: routing difficulty, material costs, cooling costs due to heat generation, power required to drive multiple passive cables, and cable weight supported by server and switch interfaces. For instance, the techniques described herein allow for a single pair of receive/transmit conductors to comprise the connection between ICs/electrical circuitry components in active cable and active backplane embodiments thereby reducing cable routing issues, heat, materials, cooling costs, weight, signal driving power, etc. The active connections according to the techniques described herein also allow for longer connection lengths between devices. A device connected using techniques described herein may optimize its communication speed and bandwidth even with a mismatch of communication protocols with another connected device. The auto-negotiation training may also be optimized to boost signal strength at different protocol communication rates and connection lengths.

The techniques and embodiments described herein provide for improvements in auto-negotiation as described above.

For instance, methods, systems, devices, and apparatuses are provided for performing improved auto-negotiation. In an example aspect, an active cable includes a first connection component, first electrical circuitry, and second electrical circuitry. The first electrical circuitry is communicatively coupled to the first connection component, and is configured to receive auto-negotiation information encoded in first physical layer signaling from an initiating device. The first electrical circuitry is also configured to generate a data packet that includes the auto-negotiation information, and to transmit the data packet via the first connection component. The second electrical circuitry is communicatively coupled to the first connection component, and configured to receive the data packet from the first electrical circuitry via the first connection component. The second electrical circuitry is further configured to encode the auto-negotiation information included in the data packet for second physical layer signaling, and to transmit the second physical layer signaling to a receiving device.

In another example aspect, an active backplane of a computing device includes first electrical circuitry and second electrical circuitry. The first electrical circuitry is communicatively coupled to the second electrical circuitry by a communication connection, and is configured to receive auto-negotiation information encoded in first physical layer signaling from a first device interface of the computing device. The first electrical circuitry is also configured to generate a data packet that includes the auto-negotiation information, and to transmit the data packet via the communication connection. The second electrical circuitry is configured to receive the data packet from the first electrical circuitry, and to encode the auto-negotiation information included in the data packet for second physical layer signaling. The second electrical circuitry is further configured to transmit the second physical layer signaling to a second device interface of the computing device.

In yet another example aspect, a line card includes a device interface, a line interface, and electrical circuitry. The electrical circuitry is communicatively coupled to the device interface and to the line interface. The electrical circuitry is configured to receive auto-negotiation information encoded in first physical layer signaling at a first rate from an initiating device via one of the device interface or the line interface. The electrical circuitry is also configured to encode the auto-negotiation information in second physical layer signaling at a second rate according to a receiving device, where the second physical layer signaling is different from the first physical layer signaling. The electrical circuitry is also configured to transmit the second physical layer signaling to the receiving device via the other one of the device interface or the line interface.

It is contemplated that different embodiments described herein may be implemented together in various combinations, as would be apparent to one of skill in the art having the benefit of this disclosure. That is, embodiments described herein are not mutually exclusive of each other and may be practiced alone, or in any combination.

Various example embodiments are described in the following subsections. In particular, example active cable and active backplane embodiments are described, followed by example line card embodiments. Next, further example embodiments and advantages are described, and subsequently an example computer implementation is described. Finally, some concluding remarks are provided. It is noted that the division of the following description generally into subsections is provided for ease of illustration, and it is to be understood that any type of embodiment may be described in any subsection.

III. Example Active Cable and Active Backplane Embodiments

As noted above, systems and devices, such as active cables, active backplanes, ICs, and electrical circuits, may be configured in various ways to perform improved auto-negotiation. Techniques and embodiments are provided for implementation in and with devices and systems that perform auto-negotiation. For instance, in embodiments, active cables and active backplanes may include ICs and/or electrical circuitry to translate auto-negotiation information between two devices.

A. Active Cable Embodiments

In embodiments, and by way of illustrative example and not limitation, two devices such as a server computer and a communication switch may be communicatively connected together using an active cable according to the described embodiments. Similarly, two switches may be linked using an active cable according to the described embodiments.

Figure 1:
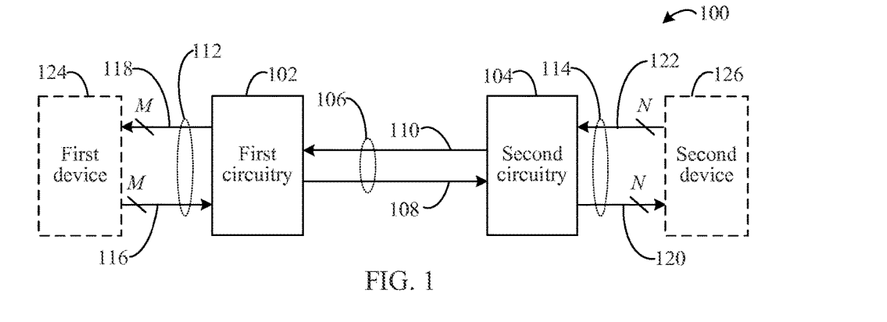
FIG. 1 shows a block diagram of an active cable for performing auto-negotiation, according to example embodiments.

FIG. 1 shows a block diagram of an example active cable 100 for implementing the above-referenced improvements. Active cable 100 may include two instances of electrical circuitry, first circuitry 102 and second circuitry 104, where first circuitry 102 and second circuitry 104 may be communicatively coupled by a first connection component comprising a single receive/transmit pair 106. First circuitry 102 and second circuitry 104 may be communicatively coupled to a second connection component comprising receive/transmit pairs 112 and a third connection component comprising receive/transmit pairs 114, respectively.

First circuitry 102 and second circuitry 104 may be respectively communicatively coupled to a first device 124 and a second device 126 for which a connection link is sought to be established by auto-negotiation via receive/transmit pairs 112 and receive/transmit pairs 114, although in embodiments, first device 124 and second device 126 may not be considered as part of active cable 100.

Receive/transmit pair 106 may comprise a first connection component 108 and a second connection component 110. First connection component 108 and second connection component 110 may be electrically conductive components such as metal wires or optical components in embodiments, and may be configured to allow a first rate of communication between first circuitry 102 and second circuitry 104 that is greater than or equal to communication rates of receive/transmit pairs 112 and receive/transmit pairs 114. It is also contemplated that receive/transmit pair 106 may comprise more than one receive/transmit pairs (i.e., a plurality of first connection component 108 and second connection component 110), and that receive/transmit pair 106 may comprise a single conductive metal wire or optical component configured to receive and to transmit. In embodiments, receive/transmit pair 106 may be of a length that comprises at least a majority of a total length of active cable 100, and that may comprise substantially the total length of active cable 100 excepting sufficient lengths of receive/transmit pairs 112 and receive/transmit pairs 114 to allow for adequate connections to first device 124 and second device 126 respectively.

Receive/transmit pairs 112 may comprise one or more pairs ('M' pairs) and receive/transmit pairs 114 may comprise one or more pairs ('N' pairs). Receive/transmit pairs 112 may include M third connection components 116 and M fourth connection components 118, and receive/transmit pairs 114 may include N fifth connection components 120 and N sixth connection components 122. M may be determined or designated based on a communication rate of first device 124. For example, M may be equal to 1 in embodiments in which first device 124 operates at a communication rate of 100 Gb, M may be equal to 10 in embodiments in which first device 124 operates at a communication rate of 10 Gb so as to allow first device 124 to realize a 100 Gb communication rate (i.e., 10×10 Gb=100 Gb), or M may be equal to 4 in embodiments in which first device 124 operates at a communication rate of 25 Gb so as to allow first device 124 to realize a 100 Gb communication rate (i.e., 4×25 Gb=100 Gb), etc. N may be determined or designated similarly based on a communication rate of second device 126. In embodiments, M and N may be unequal due to the fact that first device 124 and second device 126 support different communication rates and/or protocols. Receive/transmit pairs 112 and receive/transmit pairs 114 may comprise electrically conductive components similar to standard passive cable connections, or may comprise other media types such as fiber optic connections. Receive/transmit pairs 112 and receive/transmit pairs 114 may include connection interfaces at their respective endpoints for connecting to electrical circuitry or ICs of active cable 100, and for connecting to devices such as first device 124 and second device 126. Such interfaces may include wire interfaces, RJ-45 connectors, and/or the like.

First device 124 and second device 126 may be any devices for which a communication link is sought via auto-negotiation, e.g., via auto-negotiation as defined in clause 73 of IEEE standard 802.3. In embodiments, first device 124 may be a communication switch or router, and second device 126 may be a computer such as a server, or vice versa. It is contemplated in embodiments that first device 124 and second device 126 may be other combinations of devices, such as those described herein, e.g., two switches or two routers, to be linked using auto-negotiation. First device 124 and second device 126 may implement different auto-negotiation formats and/or communication rates from each other. First device 124 and second device 126 may be configured to advertise their communication capabilities via their respective auto-negotiation protocols as would be understood by a person of skill in the relevant art(s) having the benefit of this disclosure. That is, auto-negotiation information for a given device may be encoded in physical layer signaling and transmitted by the device to another device with which a communication link is desired.

First circuitry 102 may be an IC or electrical circuitry configured to receive or intercept auto-negotiation information encoded in first physical layer signaling according an auto-negotiation protocol from an initiating device. In the context of the embodiment shown in FIG. 1, first device 124 may be the initiating device, although this example is not intended to be limiting. For instance, in embodiments each of first device 124 and second device 126 may initiate auto-negotiation advertising upon connection of active cable 100 thereto. First circuitry 102 may be configured to generate a data packet that includes the auto-negotiation information. First circuitry 102 may generate the data packet by translating the embedded auto-negotiation information from the received first physical layer signaling and generating the data packet to include or encapsulate the auto-negotiation information in the packet payload. It should be noted that while the generation of a data packet is described, in embodiments, the generation of multiple data packets, multi-frame data packets, and/or other types of data transmission for transmitting of the auto-negotiation information are contemplated. As used herein, the term "data packet" indicates a physical layer encoding of the data that is different from the auto-negotiation signaling as described in clause 73 of IEEE 802.3, and also encompasses multi-frame data packets.

First circuitry 102 may be configured to transmit the data packet to second circuitry 104 via the first connection component, i.e., receive/transmit pair 106. The rate at which the data packet is transmitted via receive/transmit pair 106 may be greater than or equal to the rate at which the auto-negotiation information was transmitted from first device 124. For example, first circuitry 102 may be configured to transmit the data packet at a rate that is at least M-times a second rate of transmission of the first physical layer signaling provided from first device 124. In embodiments, first circuitry 102 may be configured to transmit the data packet at a rate equal to the second rate of transmission of the first physical layer signaling provided from first device 124. Additionally, first circuitry 102 may be configured to generate the data packet in a format that is not in accordance with the auto-negotiation protocol by which the auto-negotiation information was received from first device 124, such as, but not limited to, a standardized, high-speed data transmission protocol, a proprietary, high-speed data transmission protocol, etc.

Second circuitry 104 may be an IC or electrical circuitry configured to receive the data packet from first circuitry 102 via receive/transmit pair 106. Second circuitry 104 may be configured to translate the auto-negotiation information included/encapsulated in the data packet and to encode the auto-negotiation information for second physical layer signaling according to the auto-negotiation protocol and/or communication rate of second device 126. Second circuitry 104 may be configured to transmit the second physical layer signaling to a receiving device, e.g., second device 126 in the described embodiment. For example, second circuitry 104 may be configured to transmit the second physical layer signaling at a rate according to the standard auto-negotiation protocol of second device 126 that is equal to the data packet transmission rate divided by N (i.e., 1/N).

As noted above, for auto-negotiation, each device to be linked may advertise its capabilities to the other device. In the foregoing description of FIG. 1, first device 124 is described as the initiating device. However, embodiments also contemplate auto-negotiation advertisement initiating from second device 126. In embodiments in which second device 126 is the initiating device and in which first device 124 is the receiving device for auto-negotiation advertisement, the features performed by first circuitry 102 as described immediately may be similarly performed by second circuitry 104, and vice versa. That is, each of first circuitry 102 and second circuitry 104 may be configured to handle auto-negotiation information flowing to and from each of first device 124 and second device 126 in order to establish a communication link there between. It should be noted that first device 124 and second device 126 may advertise their capabilities via auto-negotiation at the same time, at approximately the same time, or within a contemporaneous context relative to the attachment of active cable 100 to the devices.

In accordance with the embodiments described above, second device 126 may receive auto-negotiation information from first device 124, and first device 124 may receive auto-negotiation information from second device 126 without knowledge of the operations and functions of active cable 100. As active cable 100 translates and encodes the respective auto-negotiation information from each of first device 124 and second device 126 prior to providing this information to the other link device, each device receives auto-negotiation information from the other according to its own advertised capabilities. This allows each device to operate at or above its highest respective rate or bandwidth across one or more channels to achieve a relatively high, common bandwidth between the devices.

For example, it is further contemplated that first device 124 and/or second device 126 may operate above their specified maximum communication rates through the embodiments of active cable 100 described herein. For instance, specified maximum communication rates include per-lane data rates (e.g., converting 4×10 Gb to 1×40 Gb, or 10×10 Gb to 1×100 Gb). In such embodiments, the overall data rate is constant, and the rate per lane changes to reduce materials cost and/or number of lanes. As noted above in some embodiments a first device (e.g., first device 124) with an operating communication rate of 10 Gb may be linked via active cable 100 having 10 connection pairs for the first device to a second device (e.g., second device 126) with an operating communication rate of 100 Gb for an effective 100 Gb throughput for each device. However, embodiments herein also provide for connecting two devices at a higher overall bandwidth than either device's advertised communication rates. For example, a first device (e.g., first device 124) with an operating communication rate of 10 Gb may be linked via active cable 100 having 10 connection pairs for the first device to a second device (e.g., second device 126) with an operating communication rate of 25 Gb using 4 connection pairs for the second device. Thus, an effective 100 Gb throughput for each device may be realized with active cable 100.

Subsequent to a communication link being established between first device 124 and second device 126 using the auto-negotiation information from these devices as described above, first circuitry 102 may be configured to receive and transmit operating data communications with first device 124 at a second rate over M channels according to the capabilities of first device 124, and second circuitry 104 may be configured to receive and transmit operating data communications with second device 126 at a third rate over N channels according to the capabilities of second device 126. First circuitry 102 and second circuitry 104 are configured to transmit/receive data packets to/from each other at a first rate that is greater than or equal to the second rate and/or the third rate.

Figure 2:
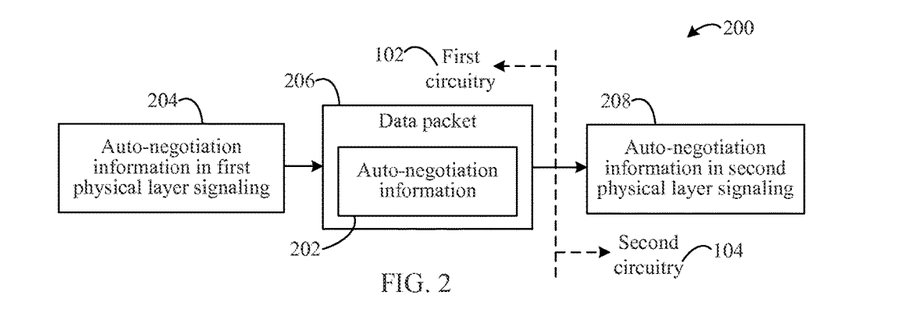
FIG. 2 shows a block diagram of auto-negotiation functionality for an active cable, according to example embodiments.

Turning now to FIG. 2, a flow diagram 200 is shown. Example embodiments described herein may be configured to perform auto-negotiation according to flow diagram 200. For instance, active cable 100 of FIG. 1, along with any subcomponents thereof, may be configured to perform auto-negotiation according to flow diagram 200.

For example, in an embodiment in which first circuitry 102 and second circuitry 104 perform auto-negotiation in accordance with flow diagram 200, first circuitry 102 may receive auto-negotiation information 202 embedded in first physical layer signaling 204 from first device 124. First circuitry 102 may receive auto-negotiation information 202 from first device 124 via receive/transmit pairs 112.

First circuitry 102 may generate a data packet 206. Data packet 206 may include or encapsulate auto-negotiation information 202 embedded in the first layer signaling 204 subsequent to first circuitry 102 intercepting and translating the received auto-negotiation information 202. First circuitry 102 may generate data packet 206 according to a standardized, high-speed data transmission protocol, a proprietary, high-speed data transmission protocol, and/or the like, according to embodiments. The format of data packet 206 may be different than that used by the auto-negotiation protocol of the received first physical layer signaling 204, and data packet 206 may be transmitted to second circuitry 104 via receive/transmit pair 106 at a higher transmission rate than that used to receive auto-negotiation from first device 124.

Second circuitry 104 may receive data packet 206 that includes auto-negotiation information 202 via receive/transmit pair 106 from first circuitry 102. Second circuitry 104 may embed auto-negotiation information 202 in second physical layer signaling 208 that is transmitted to second device 126. Second circuitry 104 may transmit auto-negotiation information 202 to second device 126 via receive/transmit pairs 114 according to the auto-negotiation protocol thereof.

B. Active Backplane Embodiments

In embodiments, and by way of illustrative example and not limitation, two devices or components of a computer or computing device, such as a server computer, a desktop computer, a laptop computer, and/or the like, or of a communication device such as a switch or router, may be communicatively connected together using an active backplane according to the described embodiments. In the context of active backplane embodiments, devices and components of computers/servers are discussed, although the embodiments herein are not so limited. Devices or components of a computer may be video cards, sound cards, line cards, memory, storage drives, motherboards, daughter boards, universal serial bus devices, etc., or equivalent components as circuitry on, or separate from, individual cards/boards, as may be included in computers or computing devices.

Figure 3:
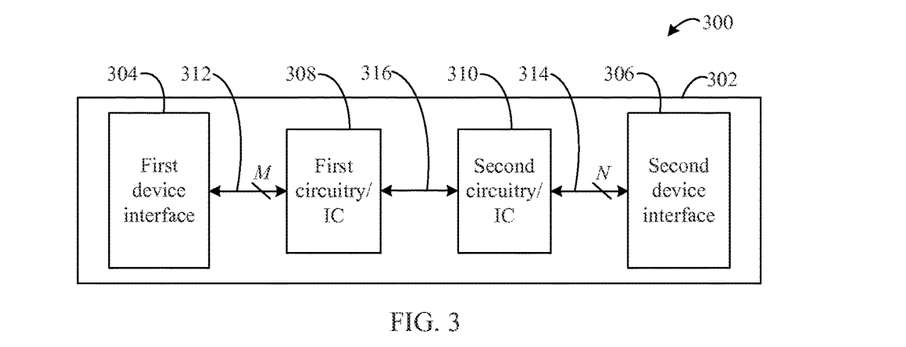
FIG. 3 shows a block diagram of an active backplane for performing auto-negotiation, according to an example embodiment.

FIG. 3 shows a block diagram of an example active backplane 300 for implementing the above-referenced auto-negotiation improvements. Active backplane 300 may include a substrate 302 having a first device interface 304, a second device interface 306, and two instances of electrical circuitry or ICs as similarly described for first circuitry 102 and second circuitry 104 with respect to active cable 100 of FIG. 1, and referred to here for clarity as first circuitry 308 and second circuitry 310.

First circuitry 308 and second circuitry 310 may be communicatively coupled by a first connection component comprising single receive/transmit pair 316, similarly configured as single receive/transmit pair 106 described for active cable 100 of FIG. 1. In embodiments, receive/transmit pair 316 may be of a length that comprises at least a majority of a total connection length between first device interface 304 and second device interface 306, and that may comprise substantially the entirety of the total connection length between first device interface 304 and second device interface 306 excepting sufficient lengths of receive/transmit pairs 312 and receive/transmit pairs 314 to allow for adequate connections to first device interface 304 and second device interface 306 respectively.

First circuitry 308 and second circuitry 310 may be communicatively coupled to a second connection component comprising receive/transmit pairs 312 and a third connection component comprising receive/transmit pairs 314, respectively, similarly as described in FIG. 1 for receive/transmit pairs 112 and receive/transmit pairs 114. First circuitry 308 and second circuitry 310 may thus be respectively communicatively coupled to first device interface 304 and second device interface 306 via receive/transmit pairs 312 and receive/transmit pairs 314, as illustrated in FIG. 3. First device interface 304 and second device interface 306 may interface with computer devices and components as described herein for which a connection link is sought to be established by auto-negotiation via receive/transmit pairs 312 and receive/transmit pairs 314.

Substrate 302 may be a substrate that is comprised of any known materials used for backplanes including, without limitation, printed circuit boards (PCBs), silicon substrates, composite materials, and/or the like. In embodiments, substrate 302 may comprise at least a portion of a motherboard or a daughter board.

Receive/transmit pairs 312 and receive/transmit pairs 314 may be similarly configured as described above with respect to FIG. 1 for receive/transmit pairs 112 and receive/transmit pairs 114, e.g., having M and N connection component pairs respectively. In active backplane embodiments, receive/transmit pairs 312 and receive/transmit pairs 314 may be metal wires, board traces, and/or the like, as described herein.

In embodiments, first device interface 304 and second device interface 306 may comprise any type of interface, such as, but without limitation, wire interfaces, slots, sockets, mounting vias, mounting pads, wire or trace connections, jumpers, RJ-45 receivers and/or other network connectors, and/or the like. Computer devices and components for which a communication link is sought via auto-negotiation, e.g., via auto-negotiation as defined in clause 73 of IEEE standard 802.3 (e.g., the "KR" backplane standard), may interface with active backplane 300 through first device interface 304 and second device interface 306. These computer devices and components may implement different auto-negotiation formats and/or communication rates from each other, and may advertise their communication capabilities via their respective auto-negotiation protocols as would be understood by a person of skill in the relevant art(s) having the benefit of this disclosure.

First circuitry 308 may be an IC or electrical circuitry configured to receive auto-negotiation information over receive/transmit pairs 312 from an initiating device via first device interface 304. In the context of the illustrated embodiment shown in FIG. 3, first device interface 304 may interface with the initiating device, although the inventive techniques are not so limited. For instance, in embodiments each of first device interface 304 and second device interface 306 may interface with a device or component of a computer that initiates auto-negotiation advertising upon connection to active backplane 300. First circuitry 308 may be configured to generate a data packet that includes/encapsulates auto-negotiation information as described above with respect to FIG. 1 for first circuitry 102. Furthermore, first circuitry 308 may be configured to transmit the data packet to second circuitry 310 via the first connection component, i.e., receive/transmit pair 316 of FIG. 3, as similarly described above, in embodiments.

Second circuitry 310 may be an IC or electrical circuitry configured to receive the data packet from first circuitry 308 via receive/transmit pair 316. Second circuitry 310 may be configured to translate the auto-negotiation information included in the data packet and to encode the auto-negotiation information for transmission over receive/transmit pairs 314 to a computer device or component via second device interface 306, similarly as second circuitry 104 of FIG. 1.

As noted above, for auto-negotiation, each device to be linked may advertise its capabilities to the other device. In the context of the example embodiment shown in FIG. 3 and described above, auto-negotiation advertisement may be initiated from a computer device/component interfacing with first device interface 304 or with second device interface 306. That is, each of first circuitry 308 and second circuitry 310 of active backplane 300 may be configured to handle auto-negotiation information flowing to and from computer devices/components interfacing with first device interface 304 and with second device interface 306 in order to establish a communication link.

Accordingly, subsequent to a communication link being established between computer devices/components interfacing with first device interface 304 and with second device interface 306 of active backplane 300, first circuitry 308 and second circuitry 310 are configured to receive and transmit operating data communications with the computer devices/components according to devices/components respective capabilities. Furthermore, as noted above with respect to first circuitry 102 and second circuitry 104 of active cable 100 of FIG. 1, first circuitry 308 and second circuitry 310 may be configured to transmit/receive data packets to/from each other at a rate that is greater than or equal to the communication rates of the linked computer devices/components.

It is further contemplated herein that an active backplane may be realized by active cables, e.g., one or more of active cable 100 of FIG. 1, which may be configured to link computer devices/components of a computing device and/or to link two or more computing devices such as server computers.

C. Active Cable and Active Backplane Operational Embodiments

Figure 4:
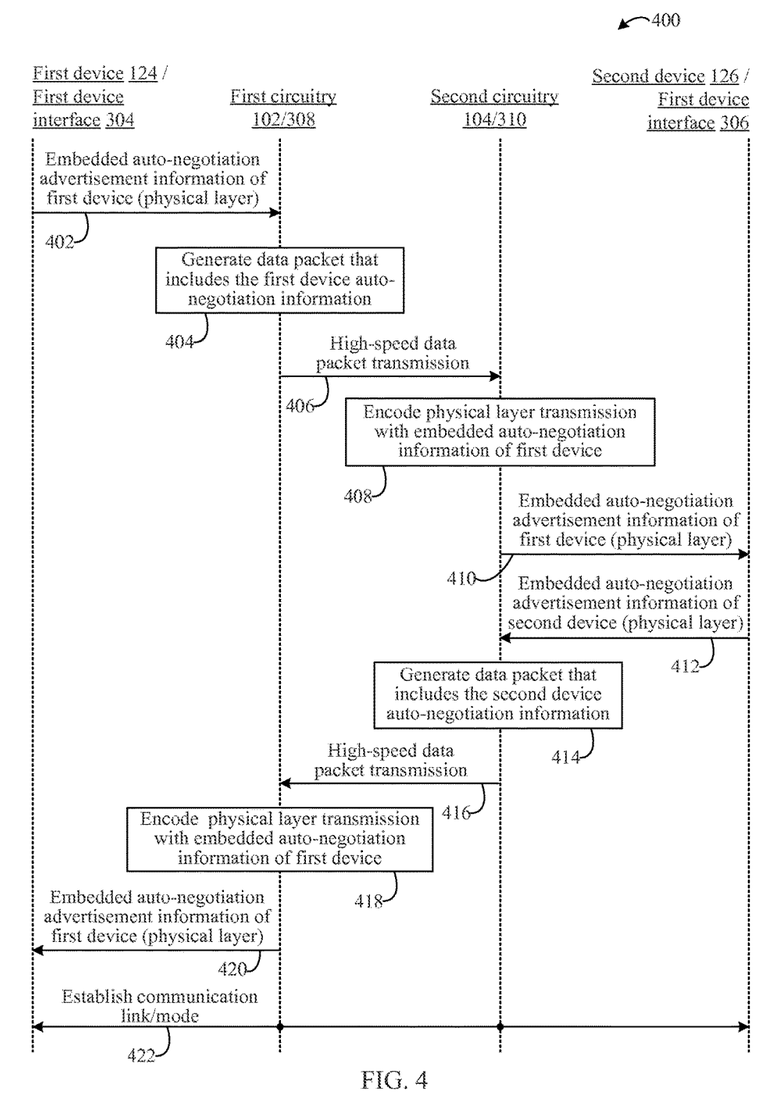
FIG. 4 shows a flow diagram of auto-negotiation for the active cable of FIG. 1 and the active backplane of FIG. 3, according to an example embodiment.

Turning now to FIG. 4, a flow diagram 400 is shown. Example embodiments described herein may be configured to perform auto-negotiation according to flow diagram 400. For instance, active cable 100 of FIG. 1 and active backplane 300 of FIG. 3, along with any respective subcomponents thereof, may be configured to perform auto-negotiation according to flow diagram 400.

For example, flow diagram 400 shows an exemplary flow of auto-negotiation that may be performed by first circuitry 102 and second circuitry 104 of active cable 100 that connects first device 124 and second device 126. The exemplary flow of auto-negotiation of flow diagram 400 may also be performed by first circuitry 308 and second circuitry 310 of active backplane 300 that connects devices via first device interface 304 and second device interface 306.

Embedded auto-negotiation advertisement information of a first device in physical layer signaling may be provided to first circuitry (402). For instance, auto-negotiation information embedded in first physical layer signaling from first device 124 of FIG. 1 may be received by first circuitry 102 in active cable embodiments. Auto-negotiation information from a computer device/component interfaced with first device interface 304 of FIG. 3 may be received by first circuitry 308 in active backplane embodiments. In each of these embodiments, first circuitry 102/308 may receive auto-negotiation information via receive/transmit pairs 112/312 according to a standard auto-negotiation protocol.

A data packet that includes the first device auto-negotiation information may be generated (404). For example, a data packet may be generated by first circuitry 102 in active cable and by first circuitry 308 in active backplane embodiments. The data packet may be generated to include or encapsulate auto-negotiation information received at 402. First circuitry 102/308 may translate the embedded auto-negotiation information after extracting it from the signaling in which it was received, and generate the data packet according to a standardized, high-speed data transmission protocol, a proprietary, high-speed data transmission protocol, and/or the like, according to embodiments. The format of the data packet may be different than that used by the auto-negotiation protocol according to which the auto-negotiation information was received by first circuitry 102/308.

A high-speed data packet transmission may be performed (406). For example, the data packet generated at 404 may be transmitted from first circuitry 102/308 and received by second circuitry 104/310 via receive/transmit pair 106/316 (as shown in FIGS. 1 and 3) at a higher rate than the auto-negotiation information was received by first circuitry 102/308. For example, in embodiments with M receive/transmit pairs 112/312, the data packet may be transmitted in 406 at least M-times faster.

A physical layer transmission with embedded auto-negotiation information of the first device may be encoded (408). In embodiments, second circuitry 104 may be configured to embed auto-negotiation information received in the data packet into the second physical layer signaling that is transmitted to second device 126 of FIG. 1 in active cable embodiments, or a computer device/component interfaced with second device interface 306 of FIG. 3 in active backplane embodiments. For instance, after extracting the auto-negotiation information from the data packet, second circuitry 104/310 may encode, i.e., translate and embed, the auto-negotiation information into physical layer signaling for transmission according to an auto-negotiation protocol of second device 126 or a computer device/component interfaced with second device interface 306.

Embedded auto-negotiation advertisement information of the first device in physical layer signaling may be transmitted (410). For example, second circuitry 104/310 may be configured to transmit the embedded auto-negotiation information of the first device in physical layer signaling for an auto-negotiation protocol of a second device, e.g., second device 126 of FIG. 1 in active cable embodiments, or a computer device/component interfaced with second device interface 306 of FIG. 3 in active backplane embodiments. The rate at which the embedded auto-negotiation information is sent may be the rate for the received data packet divided by the number of receive/transmit pairs 112/312 ('N').

Embedded auto-negotiation advertisement information of the second device in physical layer signaling may be provided to second circuitry (412). For instance, auto-negotiation information embedded in second physical layer signaling from second device 126 of FIG. 1, may be received by second circuitry 104 in active cable embodiments. Auto-negotiation information from a computer device/component interfaced with second device interface 306 of FIG. 3, may be received by second circuitry 310 in active backplane embodiments. In each of these embodiments, second circuitry 104/310 may receive auto-negotiation information via receive/transmit pairs 114/314 according to a standard auto-negotiation protocol.

A data packet that includes the second device auto-negotiation information may be generated (414). For example, a data packet may be generated by second circuitry 104/310 in active cable and active backplane embodiments. The data packet may be generated to include or encapsulate auto-negotiation information received at 412. Second circuitry 104/310 may translate the embedded auto-negotiation information by extracting it from the signaling in which it was received, and generate the data packet according to a standardized, high-speed data transmission protocol, a proprietary, high-speed data transmission protocol, and/or the like, according to embodiments. The format of the data packet may be different than the auto-negotiation protocol according to which the auto-negotiation information was received by second circuitry 104/310.

A high-speed data packet transmission may be performed (416). For example, the data packet generated at 414 may be transmitted from second circuitry 104/310 and received by first circuitry 102/308 via receive/transmit pair 106/316 (as shown in FIGS. 1 and 3) at a higher rate than the auto-negotiation information was received by second circuitry 104/310. For example, in embodiments with N receive/transmit pairs 114/314, the data packet may be transmitted in 416 at least N-times faster.

A physical layer transmission with embedded auto-negotiation information of the second device may be encoded (418). In embodiments, first circuitry 102/308 may be configured to embed auto-negotiation information received in the data packet (416) into the first physical layer signaling that is transmitted to first device 124 of FIG. 1 in active cable embodiments, or a computer device/component interfaced with first device interface 304 of FIG. 3 in active backplane embodiments. For instance, after extracting the auto-negotiation information from the data packet, first circuitry 102/308 may encode, i.e., translate and embed, the auto-negotiation information into physical layer signaling for transmission according to an auto-negotiation protocol of first device 124 or a computer device/component interfaced with first device interface 304.

Embedded auto-negotiation advertisement information of the second device in physical layer signaling may be transmitted (420). For example, first circuitry 102/308 may be configured to transmit the embedded auto-negotiation information of the second device in physical layer signaling to first device 124 of FIG. 1 in active cable embodiments, or a computer device/component interfaced with first device interface 304 of FIG. 3 in active backplane embodiments. The rate at which the embedded auto-negotiation information is sent may be the rate for the received data packet divided by the number of receive/transmit pairs 112/312 ('M').

A communication link may be established according to the negotiated modes (422). In embodiments, the communication link may be established between first device 124 and second device 126 in active cable embodiments, or between a computer devices/components interfaced with first device interface 304 and second device interface 306 in active backplane embodiments. Data communications between the linked devices traverse first circuitry 102/308 and second circuitry 104/310 in active cable and active backplane embodiments. Accordingly, subsequent to the establishment of the communication link, first circuitry 102/308 is configured to receive and transmit first operating data communications with first device 124, or a computer device/component interfaced with first device interface 304, at the second rate over 'N' channels, and second circuitry 104/310 is configured to receive and transmit second operating data communications with second device 126, or a computer device/component interfaced with second device interface 306, at the third rate over 'M' channels, as described herein.

In some example embodiments, one or more of operations 402, 404, 406, 408, 410, 412, 414, 416, 418, 420, and/or 422 of flow diagram 400 may not be performed. Moreover, capabilities in addition to or in lieu of operations 402, 404, 406, 408, 410, 412, 414, 416, 418, 420, and/or 422 may be performed. Further, in some example embodiments, one or more of operations 402, 404, 406, 408, 410, 412, 414, 416, 418, 420, and/or 422 may be performed out of order, in an alternate sequence, or partially (or completely) concurrently with each other or with other operations. For instance, in embodiments, operations 402, 404, 406, 408, and 410 may be performed partially or completely concurrently with operations 412, 414, 416, 418, and/or 420.

IV. Example Line Card Embodiments

As noted above, systems and devices, such as line cards, ICs, and electrical circuits, may be configured in various ways to perform auto-negotiation according to the techniques and embodiments described herein. For instance, in embodiments, line cards may include an IC and/or electrical circuitry to translate auto-negotiation information between two devices, systems, and/or components.

In embodiments, and by way of illustrative example and not limitation, two devices such as a server computer and a communication switch, or two communication switches, may be communicatively connected together using a line card according to the described embodiments. A line card implementing the techniques described herein may be installed in/with a server or in/with a switch in embodiments and is considered an active line card in the context of this disclosure.

Figure 5:
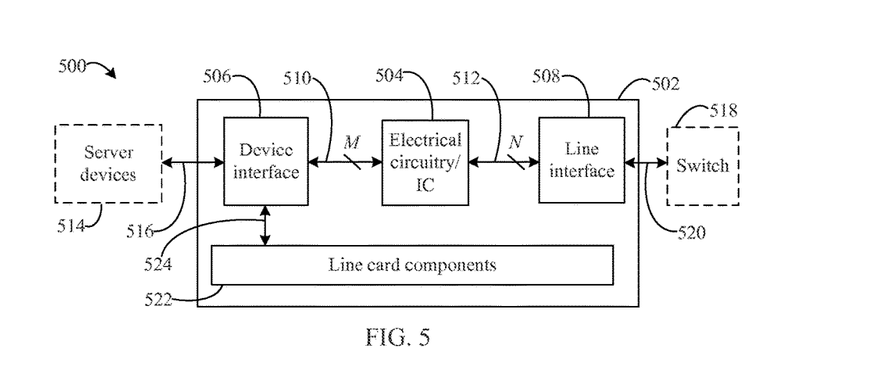
FIG. 5 shows a block diagram of a line card for performing auto-negotiation, according to an example embodiment.

FIG. 5 shows a block diagram of an example line card 500 for implementing the above-referenced improvements. Line card 500 may include a substrate 502 having a device interface 506, a line interface 508, and electrical circuitry or an IC as similarly described with respect to active backplane 300 of FIG. 3, referred to here as circuitry 504. Line card 500 may also include one or more additional line card components 522 that may comprise components for standard operation of a line card, according to embodiments.

Circuitry 504 may be communicatively coupled to a first connection component comprising receive/transmit pairs 510 and a second connection component comprising receive/transmit pairs 512. Receive/transmit pairs 510 may also be communicatively coupled to device interface 506, and receive/transmit pairs 512 may also be communicatively coupled to line interface 508, thus allowing circuitry 504 to communicate electronic information with systems, devices, and/or components interfaced with device interface 506 and line interface 508, such as line card components 522 via a connection 524, server devices 514 via a connection 516, communication switch 518 via a connection 520, and/or the like.

In the embodiment illustrated in FIG. 5, line card 500 may be installed in/with a server computer (not shown but exemplified in FIG. 8 described below), having server devices 514 and/or components, in order to perform auto-negotiation with a communication switch (i.e., switch 518). Accordingly, line card 500 may communicate with switch 518 via line interface 508 over connection 520, which may be a passive cable in embodiments, to perform the auto-negotiation techniques described herein. Line card 500 may also communicate with line card components 522 and/or server devices 514 to perform the auto-negotiation techniques described herein. However, the disclosed embodiments are not so limited. Embodiments are also contemplated herein in which line card 500 may be installed in/with switch 518 or some other system/device/component via device interface 506, wherein line card 500 communicates with a server and server devices 514 (or other systems/devices/components, such as another switch 518) via line interface 508.

In embodiments, such as the embodiment illustrated in FIG. 5, device interface 506 may receive auto-negotiation information in an advertisement from line card components 522 or from other devices, systems, and/or components that interface with device interface 506 (such as server devices 514).

Substrate 502 may be a substrate that is comprised of any known materials used for line cards including, without limitation, printed circuit boards (PCBs), silicon substrates, composite materials, and/or the like. In embodiments, substrate 502 may comprise at least a portion of a motherboard or a daughter board.

Receive/transmit pairs 510 may comprise one or more pairs ('M' pairs) and receive/transmit pairs 512 may comprise one or more pairs ('N' pairs), as similarly described above with respect to receive/transmit pairs 312 and receive/transmit pairs 314 of FIG. 3. M may be determined or designated based on a communication rate of devices, systems, and/or components interfaced with device interface 506. For example, M may be equal to 1 in embodiments in which server devices 514 and/or line card components 522 operate at a communication rate of 100 Gb, M may be equal to 10 in embodiments in which server devices 514 and/or line card components 522 operate at a communication rate of 10 Gb so as to allow server devices 514 and/or line card components 522 to realize a 100 Gb communication rate (i.e., 10×10 Gb=100 Gb), or M may be equal to 4 in embodiments in which server devices 514 and/or line card components 522 operate at a communication rate of 25 Gb so as to allow server devices 514 and/or line card components 522 to realize a 100 Gb communication rate (i.e., 4×25 Gb=100 Gb), etc. N may be determined or designated similarly based on the communication rate of a system, device, or component interfaced with line interface 508 (e.g., switch 518, as shown in FIG. 5). In embodiments, M and N may be unequal due to the fact that devices, systems, and/or components interfaced with device interface 506 and line interface 508 support different communication rates and/or protocols. For example, the total data rate may be constant across both established links, but the rate per lane of either link may be different on the line side and the system side.

Receive/transmit pairs 510 and receive/transmit pairs 512 may comprise electrically conductive components such as metal wires or board traces, including single conductive metal wire/trace components configured to receive and to transmit, or other electrically conductive components used in electrical or communication connections for line cards. Receive/transmit pairs 510 and receive/transmit pairs 512 may include connection interfaces at their respective endpoints for connecting to circuitry 504 of line card 500, and for connecting to device interface 506 and to line interface 508. Such interfaces may include wire interfaces, connections to interfaces described herein such as device interface 506 and line interface 508 (see below), other connectors, and/or the like.

In embodiments, device interface 506 and line interface 508 may comprise any type of interface, such as, but without limitation, wire interfaces, slots, sockets, mounting vias, mounting pads, wire or trace connections, jumpers, RJ-45 receivers and/or other network connectors, and/or the like. Server devices 514, line card components 522, switch(es) 518, and/or other components and devices for which a communication link is sought via auto-negotiation, e.g., via auto-negotiation as defined in clause 73 of IEEE standard 802.3, may interface with line card 500 through device interface 506 and/or line interface 508. These devices, systems, and components may implement different auto-negotiation formats and/or communication rates from other devices, systems, and/or components interfaced with line card 500 via device interface 506 or line interface 508, and may advertise their communication capabilities via their respective auto-negotiation protocols as would be understood by a person of skill in the relevant art(s) having the benefit of this disclosure.

In embodiments, devices, systems, and/or components interfaced with device interface 506 and line interface 508 may be any devices, systems, and/or components for which a communication link is sought via auto-negotiation, e.g., via auto-negotiation as defined in clause 73 of IEEE standard 802.3, as described herein, such as the "KR" backplane standard in 802.3. For instance, computing devices may be linked with communication devices, and communication devices may be linked with other communication devices, etc. These devices, systems, and/or components may be configured to advertise their communication capabilities as initiators via their respective auto-negotiation protocols as would be understood by a person of skill in the relevant art(s) having the benefit of this disclosure. That is, auto-negotiation information for a given initiator may be encoded in physical layer signaling and transmitted by the initiators to another device, system, and/or component (receivers) with which a communication link is desired to be established.

Circuitry 504 may be an IC or electrical circuitry configured to receive auto-negotiation information encoded in first physical layer signaling according to an auto-negotiation protocol from an initiator in a format and/or at a communication rate according to the initiator. In embodiments, circuitry 504 may be the same as, or substantially similar to, first circuitry 102 and/or second circuitry 104 described with respect to FIGS. 1 and 3. In the context of the embodiment shown in FIG. 5, devices, systems, and/or components interfaced with device interface 506 and line interface 508 may be initiators and receivers for auto-negotiation advertisements. For instance, line card components 522, a server (not shown but exemplified in FIG. 8 described below) via server devices 514, switch 518, or other devices, systems, and/or components may initiate auto-negotiation advertising upon connection to line card 500 via device interface 506 and/or line interface 508. Circuitry 504 may be configured to translate embedded auto-negotiation information from received first physical layer signaling of interfaced initiators for which a communication link is sought to be established, and encode the auto-negotiation information for second physical layer signaling of the receivers to be linked according to the auto-negotiation protocol and/or rate of the receivers. Circuitry 504 may be further configured to transmit the second physical layer signaling to the receiver at the specified protocol and/or rate of the receiver.

As noted above, for auto-negotiation, initiators to be linked may advertise capabilities to receivers, and such advertisements may be performed at the same time, at approximately the same time, or within a contemporaneous context relative to connection with line card 500.

In accordance with the embodiments described above, auto-negotiation information may be received from initiators by receivers without knowledge of the operations and functions of line card 500. As line card 500 translates and encodes the respective auto-negotiation information from each initiator prior to providing this information to the receiver (i.e., the other link device), auto-negotiation information is received by the receivers according to their own advertised capabilities. This allows each device, system, and/or component to operate at or above its highest specified respective rate or bandwidth across one or more channels to achieve a common rate or bandwidth. It is further contemplated that common rates/bandwidths above specified maximum rates may be achieved through the embodiments of line card 500 described herein, similarly as described above for active cable 100 and active backplane 300.

Accordingly, subsequent to a communication link being established between devices, systems, and/or components interfacing with device interface 506 and with line interface 508 of line card 500, circuitry 504 is configured to receive and transmit operating data communications with the devices, systems, and/or components according to their respective capabilities. Furthermore, as noted above with respect to active cable 100 of FIG. 1 and active backplane 300 of FIG. 3, circuitry 504 may be configured to transmit/receive data packets to/from each other at a rate that is greater than or equal to the communication rates of the linked computer devices/components.

It is further contemplated that in embodiments, variations of line card 500 may reside outside of a device having a standard line card. In such embodiments, these variations of line card 500 may be communicatively coupled in-line with the standard line card via device interface 506 and with another device via line interface 508.

Figure 6:
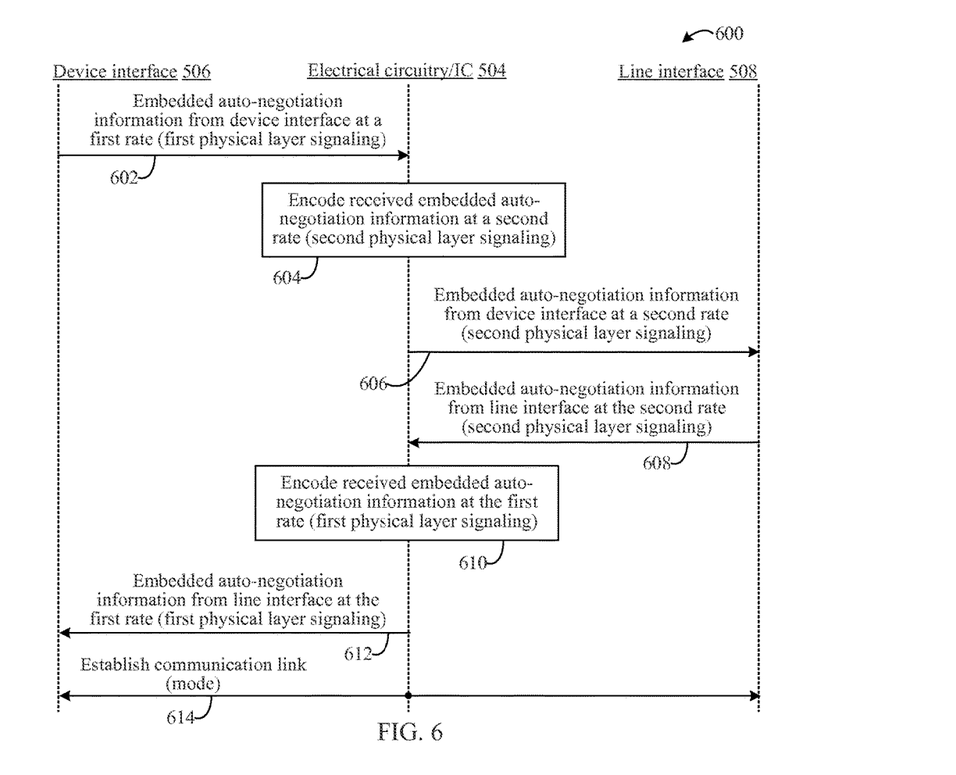
FIG. 6 shows a flow diagram of auto-negotiation for the line card of FIG. 5, according to an example embodiment.

Turning now to FIG. 6, a flow diagram 600 is shown. Example embodiments described herein may be configured to perform auto-negotiation according to flow diagram 600. For instance, line card 500 of FIG. 5, along with any respective subcomponents thereof, may be configured to perform auto-negotiation according to flow diagram 600.

For example, flow diagram 600 shows an exemplary flow of auto-negotiation that may be performed by circuitry 504 of line card 500.

Embedded auto-negotiation advertisement information may be received by circuitry from a device interface in first physical layer signaling at a first rate (602). For instance, auto-negotiation information embedded in first physical layer signaling from an initiator (a device, system, and/or component) interfaced with device interface 506, may be received by circuitry 504. Circuitry 504 may receive auto-negotiation information via receive/transmit pairs 510 according to an auto-negotiation protocol of this initiator at its advertised rate (the first rate).

A physical layer transmission with the auto-negotiation information from the device interface embedded within may be encoded by the circuitry (604). In embodiments, circuitry 504 may be configured to embed the received auto-negotiation information into second physical layer signaling that is transmitted to a receiver interfaced with line interface 508. For instance, after extracting the auto-negotiation information from the first physical layer signaling, circuitry 504 may encode, i.e., translate and embed, the auto-negotiation information into second physical layer signaling for transmission according to an auto-negotiation protocol of the receiver interfaced with line interface 508.

Embedded auto-negotiation advertisement information received from the device interface in second physical layer signaling may be transmitted to a line interface at a second rate (606). For example, circuitry 504 may be configured to transmit the embedded auto-negotiation information in second physical layer signaling for an auto-negotiation protocol of a device, system, and/or component interfaced with line interface 508. The rate at which the embedded auto-negotiation information is transmitted may be the rate for the device, system, and/or component interfaced with line interface 508 (i.e., the second rate) and may be different from the first rate.

Embedded auto-negotiation advertisement information may be received by the circuitry from the line interface in second physical layer signaling at the second rate (608). For instance, auto-negotiation information embedded in second physical layer signaling from an initiator (a device, system, and/or component) interfaced with line interface 508, may be received by circuitry 504. Circuitry 504 may receive auto-negotiation information via receive/transmit pairs 512 according to an auto-negotiation protocol of this initiator at its advertised rate.

A physical layer transmission with the auto-negotiation information from the line interface embedded within may be encoded at the first rate by the circuitry (610). In embodiments, circuitry 504 may be configured to embed the received auto-negotiation information (608) into first physical layer signaling that is transmitted to a receiver interfaced with device interface 506. For instance, after extracting the auto-negotiation information from the second physical layer signaling, circuitry 504 may encode, i.e., translate and embed, the auto-negotiation information into first physical layer signaling for transmission according to an auto-negotiation protocol of the receiver interfaced with device interface 506.

Embedded auto-negotiation advertisement information received from the line interface in first physical layer signaling may be transmitted to the device interface at the first rate (612). For example, circuitry 504 may be configured to transmit the embedded auto-negotiation information in second physical layer signaling to device interface 506 and subsequently to a device, system, and/or component interfaced therewith. The rate at which the embedded auto-negotiation information is transmitted may be the rate for the device, system, and/or component interfaced with device interface 506 (i.e., first rate) and may be different from the second rate.

A communication link may be established according to the negotiated modes (614). In embodiments, the communication link may be established between a device, system, and/or component interfaced with device interface 506 and a device, system, and/or component interfaced with line interface 508. Data communications between the linked devices traverse circuitry 504 in line card 500. Accordingly, subsequent to the establishment of the communication link, circuitry 504 is configured to receive and transmit first operating data communications with a device, system, and/or component interfaced with device interface 506 at the rate advertised therefor over 'M' channels, and to receive and transmit second operating data communications with a device, system, and/or component interfaced with line interface 508 at the rate advertised therefor over 'N' channels.

In some example embodiments, one or more of operations 602, 604, 606, 608, 610, 612, and/or 614 of flow diagram 600 may not be performed. Moreover, operations in addition to or in lieu of operations 602, 604, 606, 608, 610, 612, and/or 614 may be performed. Further, in some example embodiments, one or more of operations 602, 604, 606, 608, 610, 612, and/or 614 may be performed out of order, in an alternate sequence, or partially (or completely) concurrently with each other or with other operations. For instance, in embodiments, operations 602, 604, and/or 606 may be performed partially or completely concurrently with operations 608, 610, and/or 612.

V. Further Example Embodiments and Advantages

As noted above, systems and devices, including ICs and circuitry, may be configured in various ways to perform auto-negotiation according to the inventive techniques embodiments provided in/with devices and systems that perform auto-negotiation. For instance, in embodiments, devices with different communication capabilities may establish a link via auto-negotiation in which each device may subsequently operate at its respective maximum communication rate/bandwidth where the inventive auto-negotiation techniques remain invisible to the linked devices.

Figure 7:
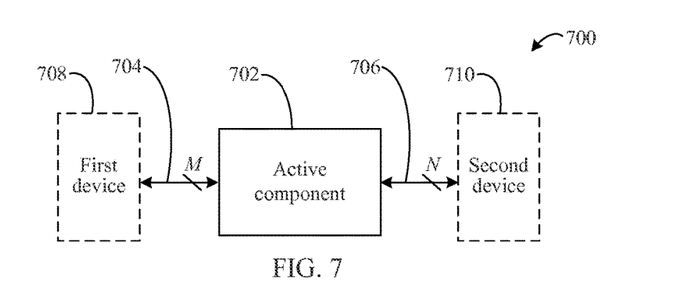
FIG. 7 shows a block diagram of an auto-negotiation device, according to an example embodiment.

FIG. 7 shows a block diagram of a general example for an auto-negotiation device 700, according to embodiments. Auto-negotiation device 700 includes an active component 702, a first communication component 704, and a second communication component 706. Auto-negotiation device 700 may be implemented in hardware, software, firmware, or any combination thereof.

As shown in FIG. 7, active component 702 may be communicatively coupled to a first device 708 by first communication component 704 having 'M' channels, and to second device 710 by second communication component 706 having 'N' channels. Active component 702 may be configured to receive auto-negotiation information embedded in respective physical layer signaling at respective rates according to a standard auto-negotiation protocol from each of first device 708 and second device 710. Active component 702 may be configured to translate and encode the auto-negotiation information embedded in the physical layer signaling from first device 708 to provide second device 710 with the auto-negotiation information in its own physical layer signaling and at its own communication rate, even if this rate is different from the rate of the physical layer signaling of first device 708. Active component 702 may be configured to translate and encode the auto-negotiation information embedded in the physical layer signaling from second device 710 to provide first device 708 with the auto-negotiation information in its own physical layer signaling and at its own communication rate, even if this rate is different from the rate of the physical layer signaling of second device 710. Active component 702 may be further configured to process and convey received auto-negotiation information within itself in formats and at rates that are different from the standard auto-negotiation protocol. It is contemplated that active component 702, first communication component 704, and second communication component 706 may be similarly configured as one or more devices, circuits, components, and/or connections described in the embodiments of other Sections of this disclosure.

Auto-negotiation device 700 may be configured to optimize auto-negotiation training, according to embodiments. For instance, one or more components of auto-negotiation device 700 such as sub-components of active component 702 may be configured to convey information within auto-negotiation device 700, and/or to transmit information from auto-negotiation device 700, at one or more signal strengths. That is, auto-negotiation device 700 and/or its sub-components may be programmed, or dynamically programmed and/or configured, according to the auto-negotiation protocols and communication rates of devices, systems, and/or components that will be linked via auto-negotiation device 700. Connection lengths, linked device requirements, and/or the like, may be factors considered in order to improve signaling between linked devices. For instance, devices, systems, and/or components utilizing relatively slower rates for protocols such as 25 Gb, 10 Gb, or slower, may be provided with signaling that has an increased signal strength from auto-negotiation device 700 and/or its sub-components.

Additionally, in embodiments for which auto-negotiation device 700 and/or its sub-components provide a communication connection within auto-negotiation device 700 between such sub-components in a single media connection or a single pair connection (e.g., connections with "thin" conductors/media), higher signaling strength may be used. Such embodiments may be also be utilized for connections between auto-negotiation device 700 and devices, systems, and/or components that use a single media connection or a single pair connection for first communication component 704 and/or second communication component 706.

Furthermore, in embodiments for which auto-negotiation device 700 and/or its sub-components provide a communication connection within auto-negotiation device 700 between such sub-components in a single media connection or a single pair connection, connection lengths may be configured up to 15 meters or more, three times the length of conventional connections.

It is also contemplated that the techniques described herein can be applied to perform auto-negotiation between devices that are adapted to work in accordance with non-standard (i.e., proprietary) auto-negotiation protocols, as well as other standard auto-negotiation protocols. That is, the techniques and embodiments described herein are not only applicable to auto-negotiation standards such as those promulgated in IEEE 802.3. The techniques and embodiments described herein also allow two devices for which a communication link is sought to be established to perform auto-negotiation using the same auto-negotiation protocol or using different auto-negotiation protocols. For instance, a first device may use a first auto-negotiation protocol, and a second device may use a second auto-negotiation protocol that is different from the first, where the circuitry described herein is configured to translate the different auto-negotiation protocols similar to the embodiments in the preceding Sections.

The further example embodiments and advantages described in this Section may be applicable to embodiments disclosed in any other Section of this disclosure.

Embodiments and techniques, including methods, described herein may be performed in various ways such as, but not limited to, being implemented by hardware, software, firmware, and/or any combination thereof. For example, embodiments may be implemented as specifically customized hardware, ASICs, electrical circuitry, and/or the like.

VI. Example Computer Implementations

Active cable 100, active backplane 300, line card 500, auto-negotiation device 700, and/or any circuit or flowchart described herein, along with any subcomponents thereof, and/or any further systems, sub-systems, and/or components disclosed herein may be implemented in hardware (e.g., hardware logic/electrical circuitry), or any combination of hardware with software (computer program code or instructions configured to be executed in one or more processors or processing devices) and/or firmware.

Figure 8:
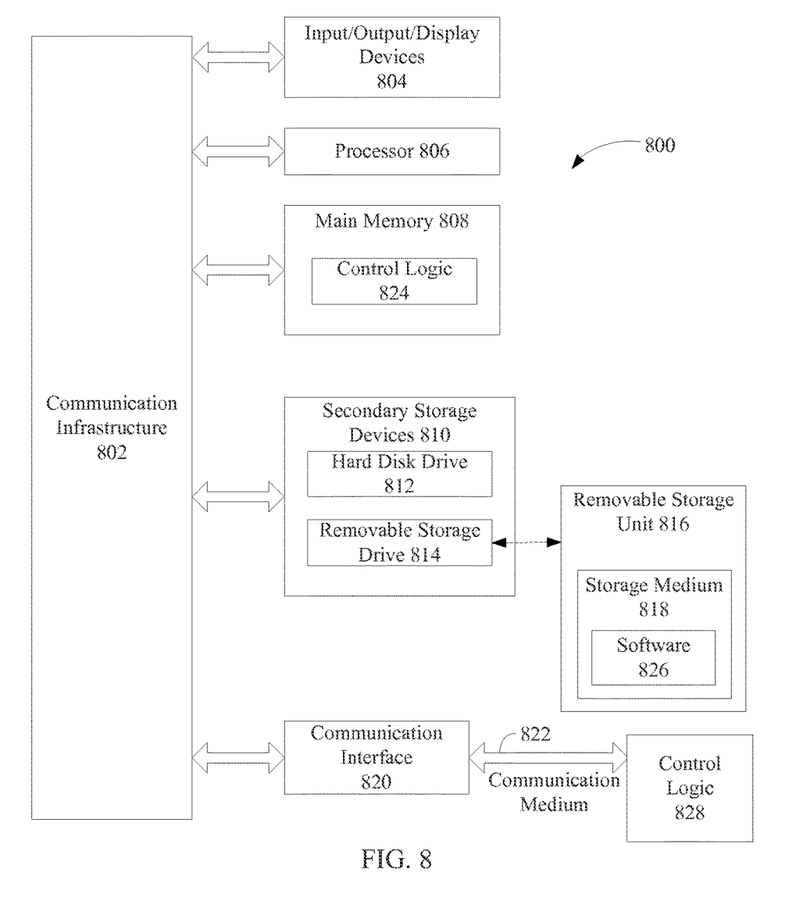
FIG. 8 shows a block diagram of a computing device/system in which the techniques disclosed herein may be performed.

The embodiments described herein, including circuitry, devices, systems, methods/processes, and/or apparatuses, may be implemented in or using well known processing devices, communication systems, servers, and/or, computers, such as a processing device 800 shown in FIG. 8. It should be noted that processing device 800 may represent communication devices/systems, entertainment systems/devices, processing devices, and/or traditional computers in one or more embodiments. For example, analog-to-digital conversion circuits for spread spectrum noise reduction, and any of the sub-systems and/or components respectively contained therein and/or associated therewith, may be implemented in or using one or more processing devices 800 and similar computing devices.

Processing device 800 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Processing device 800 may be any type of computer, including a desktop computer, a server, etc., and may be a computing device or system within another device or system.

Processing device 800 includes one or more processors (also called central processing units, or CPUs), such as a processor 806. Processor 806 is connected to a communication infrastructure 802, such as a communication bus. In some embodiments, processor 806 can simultaneously operate multiple computing threads, and in some embodiments, processor 806 may comprise one or more processors.

Processing device 800 also includes a primary or main memory 808, such as random access memory (RAM). Main memory 808 has stored therein control logic 824 (computer software), and data.

Processing device 800 also includes one or more secondary storage devices 810. Secondary storage devices 810 include, for example, a hard disk drive 812 and/or a removable storage device or drive 814, as well as other types of storage devices, such as memory cards and memory sticks. For instance, processing device 800 may include an industry standard interface, such a universal serial bus (USB) interface for interfacing with devices such as a memory stick. Removable storage drive 814 represents a floppy disk drive, a magnetic tape drive, a compact disk drive, an optical storage device, tape backup, etc.

Removable storage drive 814 interacts with a removable storage unit 816. Removable storage unit 816 includes a computer useable or readable storage medium 818 having stored therein computer software 826 (control logic) and/or data. Removable storage unit 816 represents a floppy disk, magnetic tape, compact disk, DVD, optical storage disk, or any other computer data storage device. Removable storage drive 814 reads from and/or writes to removable storage unit 816 in a well-known manner.

Processing device 800 also includes input/output/display devices 804, such as touchscreens, LED and LCD displays, monitors, keyboards, pointing devices, etc.

Processing device 800 further includes a communication or network interface 820. Communication interface 820 enables processing device 800 to communicate with remote devices. For example, communication interface 820 allows processing device 800 to communicate over communication networks or mediums 822 (representing a form of a computer useable or readable medium), such as LANs, WANs, the Internet, etc. Network interface 820 may interface with remote sites or networks via wired or wireless connections.

Control logic 828 may be transmitted to and from processing device 800 via the communication medium 822.

Any apparatus or manufacture comprising a computer useable or readable medium having control logic (software) stored therein is referred to herein as a computer program product or program storage device. This includes, but is not limited to, processing device 800, main memory 808, secondary storage devices 810, and removable storage unit 816. Such computer program products, having control logic stored therein that, when executed by one or more data processing devices, cause such data processing devices to operate as described herein, represent embodiments.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media and signals transmitted over wired media. Embodiments are also directed to such communication media.

The techniques and embodiments described herein may be implemented as, or in, various types of devices. For instance, embodiments may be included, without limitation, in processing devices (e.g., illustrated in FIG. 8) such as computers and servers, as well as communication devices such as switches, routers, gateways, and/or the like. A device, as defined herein, is a machine or manufacture as defined by 35 U.S.C. § 101. That is, as used herein, the term "device" refers to a machine or other tangible, manufactured object and excludes software and signals. Devices may include digital circuits, analog circuits, or a combination thereof. Devices may include one or more processor circuits (e.g., central processing units (CPUs), processor 806 of FIG. 8), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

VII. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:
1. An active cable that comprises:
a first connection component;
first electrical circuitry;
second electrical circuitry;
the first electrical circuitry being communicatively coupled to the first connection component, and configured to:
receive auto-negotiation information according to an auto-negotiation protocol standard encoded in first physical layer signaling from an initiating device;
generate a data packet that includes the auto-negotiation information in a format that is not in accordance with the auto-negotiation protocol standard; and
transmit the data packet via the first connection component;

the second electrical circuitry being communicatively coupled to the first connection component, and configured to:
receive the data packet from the first electrical circuitry via the first connection component;
encode the auto-negotiation information included in the data packet according to the auto-negotiation protocol standard for second physical layer signaling; and
transmit the second physical layer signaling to a receiving device;
a second connection component communicatively coupled to the initiating device and communicatively coupled to the first electrical circuitry; and
a third connection component communicatively coupled to the second electrical circuitry and communicatively coupled to the receiving device;
wherein the second connection component and the third connection component comprise M and N connection components, respectively, where N is different from M,
wherein the first electrical circuitry is configured to transmit the data packet at a first rate that is at least M-times a second rate for transmission of the first physical layer signaling, and
wherein the second electrical circuitry is configured to transmit the second physical layer signaling at a third rate that is equal to the first rate divided by N.

2. The active cable of claim 1, wherein:
the first electrical circuitry is configured to receive and transmit first operating data communications with the initiating device at the second rate subsequent to a communication link being established between the initiating device and the receiving device using at least the auto-negotiation information; and
the second electrical circuitry is configured to receive and transmit second operating data communications with the receiving device at the third rate subsequent to the communication link being established between the initiating device and the receiving device using at least the auto-negotiation information.

3. The active cable of claim 1, wherein the first connection component includes at least one receive/transmit component pair that comprises:
a fiber optic receive component and a fiber optic transmit component,
a fiber optic component configured to receive and to transmit,
a conductive metal wire receive component and a conductive metal wire transmit component, or
a conductive metal wire component configured to receive and to transmit.

4. The active cable of claim 3, wherein the at least one receive/transmit component pair is a single pair.

5. The active cable of claim 1, wherein the initiating device is a first communication switch and the receiving device is a second communication switch;
wherein the initiating device is a communication switch and the receiving device is a server computer; or
wherein the initiating device is a server computer and the receiving device is a communication switch.

6. An active backplane of a computing device, that comprises:
first electrical circuitry; and
second electrical circuitry;
the first electrical circuitry communicatively coupled to the second electrical circuitry by a communication connection, and configured to:
receive auto-negotiation information encoded in first physical layer signaling from a first device interface of the computing device using a first connection component;
generate a data packet that includes the auto-negotiation information; and
transmit the data packet via the communication connection;
the second electrical circuitry being configured to:
receive the data packet from the first electrical circuitry;
encode the auto-negotiation information included in the data packet information for second physical layer signaling; and
transmit the second physical layer signaling to a second device interface of the computing device using a second connection component,
wherein the first connection component and the second connection component comprise M and N connection components, respectively, wherein N is different from M,
wherein the first electrical circuitry is configured to transmit the data packet at a first rate that is at least M-times a second rate for transmission of the first physical layer signaling,
wherein the second electrical circuitry is configured to transmit the second physical layer signaling at a third rate that is equal to the first rate divided by N,
wherein the first electrical circuitry is configured to receive the auto-negotiation information from the first device interface according to an auto-negotiation protocol standard at the second rate,
wherein the second electrical circuitry is configured to encode the auto-negotiation information according to the auto-negotiation protocol standard at the third rate that is different than the first rate, and
wherein the first electrical circuitry is configured to generate the data packet that includes the auto-negotiation information in a format that is not in accordance with the auto-negotiation protocol standard.

7. The active backplane of claim 6, wherein the first connection component includes at least one receive/transmit component pair that comprises:
a conductive metal trace receive component and a conductive metal trace transmit component,
a conductive metal trace component configured to receive and to transmit,
a conductive metal wire receive component and a conductive metal wire transmit component, or
a conductive metal wire component configured to receive and to transmit.

8. The active backplane of claim 7, wherein the at least one receive/transmit component pair is a single pair.

9. The active backplane of claim 6, wherein at least one of the first electrical circuitry or the second electrical circuitry comprises an integrated circuit (IC) mounted to the active backplane.

* * * * *